United States Patent [19]
Bollé'

[11] Patent Number: 5,841,505
[45] Date of Patent: Nov. 24, 1998

[54] SUNGLASSES

[75] Inventor: Maurice J. Bolle', Oyonnax, France

[73] Assignee: Etablissements Bolle' S.N.C., Oyonnax, France

[21] Appl. No.: 536,046

[22] Filed: Sep. 29, 1995

Related U.S. Application Data

[63] Continuation of Ser. No. 284,039, Aug. 1, 1994, abandoned.

[51] Int. Cl.$^6$ .............................. G02C 7/10; G02C 11/08; G02C 1/04
[52] U.S. Cl. .............................. 351/44; 351/62; 351/103; 351/109; 2/435
[58] Field of Search .............................. 2/443, 447, 449, 2/435; D16/313, 314, 315, 317, 300; 351/41, 44, 47, 159, 163, 103, 109, 62

[56] References Cited

U.S. PATENT DOCUMENTS

| | | | |
|---|---|---|---|
| D. 347,017 | 5/1994 | Bollé | D16/112 |
| 2,296,634 | 9/1942 | Fink | 2/447 |
| 3,233,249 | 2/1966 | Baratelli et al. | 2/443 |
| 3,233,250 | 2/1966 | Jonassen | 2/443 |
| 4,425,669 | 1/1984 | Grendol et al. | 2/436 |
| 4,515,448 | 5/1985 | Tackles | 351/41 |
| 4,674,851 | 6/1987 | Jannard | 351/44 |
| 4,730,915 | 3/1988 | Jannard | 351/47 |
| 4,741,611 | 5/1988 | Burns | 351/44 |
| 4,843,655 | 7/1989 | Hegendorfer | 2/449 |
| 4,859,048 | 8/1989 | Jannard | 351/159 |
| 4,951,322 | 8/1990 | Lin | 2/439 |
| 5,204,700 | 4/1993 | Sansalone | 351/41 X |
| 5,208,614 | 5/1993 | Jannard | 357/41 |
| 5,359,370 | 10/1994 | Mugnier | 351/41 |
| 5,379,463 | 1/1995 | Schleger et al. | 351/44 X |
| 5,387,949 | 2/1995 | Tackles | 351/121 |

*Primary Examiner*—Hung X. Dang
*Attorney, Agent, or Firm*—Carol W. Burton; Gregg I. Anderson; Holland & Hart LLP

[57] ABSTRACT

Sunglasses are formed by an elongated curved frame with a temple hinged at each end of the frame for engaging a user's ears when the frame is in front of the user's face, and a single-piece wraparound double curvature spherical lens secured at its upper edge to the frame and depending in front of the eye portion of a user's face when the frame is supported by the temples on the user's ears. The lens is a double curvature single piece spherical lens. A nosepiece notch is formed in the center of the lower edge of the lens and a nosepiece pad is formed integrally with the lens along the notch. Rearwardly extending rounded peripheral vision shields are formed integrally with the lens on the ends thereof adjacent to and below the frame ends. The shields extend rearwardly of the frame ends for peripherally shielding the user's eyes.

13 Claims, 5 Drawing Sheets

5,841,505

SUNGLASSES

This is a continuation of Application Ser. No. 08/284,039 filed Aug. 1, 1994, now abandoned.

BACKGROUND OF THE INVENTION

1. Field of the Invention

The present invention relates to sunglasses and more particularly to single lens, wraparound sunglasses.

2. Description on the Prior Art

Wraparound sunglasses using a single or unitary lens are well-known in the art. Such glasses commonly use a unitary, curved cylindrical lens secured at its upper edge to a frame and temples or with temples secured directly to the side edges of the lens. A nose bridge is commonly cut in the lower edge of the lens or glass. Most unitary or single lens sunglasses utilize a cylindrical lens; that is, a lens or glass cut from the surface of a right cylinder to provide a horizontal curvature and a wraparound effect. Some lenses include a small, vertical curvature. These glasses are subject to distortion which adversely affects use in sports such as golf in which the participant needs a full range of both horizontal and vertical vision. While such lenses are suitable for distance or horizontal viewing, the user's view is distorted when looking downwardly.

OBJECTS OF THE INVENTION

The principal object of the present invention is to provide improved single lens, wraparound sunglasses.

Another object of the present invention is to provide sunglasses of the foregoing character which provide enhanced eye coverage and protection while providing minimum refraction or distortion of the view through the lens.

A further object of the present invention is to provide sunglasses of the foregoing character having improved fitting and retention characteristics for sports application.

Other objects and advantages will become apparent from the following description and accompanying drawings.

SUMMARY OF THE INVENTION

Sunglasses embodying the present invention include an elongated frame, a temple hinged at each end of same frame for engaging a user's ears when the frame is in front of the user's face, and a single piece, wraparound, double curvature, spherical lens secured at its upper edge to the frame and depending in front of the eye portion of a user's face when the frame is supported by said temples on a user's ears. The lens is formed as a spherical section having a spherical radius of about 9 cm. The lens in vertical cross section defines an arc of about 38° beginning about 7° below a horizontal diametrical plane and subtends an angle of about 140° in a diametrical plane. The lens defines an upper edge which is secured to the frame and a lower edge which is positionable in close juxtaposition to a user's face. A bridge notch is formed in the central lower edge of the lens, and an integral bridge pad is provided along the bridge notch. Rearwardly extending, rounded, peripheral vision shields are formed as a part of the lens on the ends thereof adjacent to and below said frame ends. The shields extend rearwardly of said frame ends for peripherally shielding a user's eyes when said sunglasses are supported in front of a user's face. These end portions are spaced from the frame so the frame and temples may be adjusted to size the glasses for each user.

DESCRIPTION OF THE PREFERRED EMBODIMENT

Figure 1:
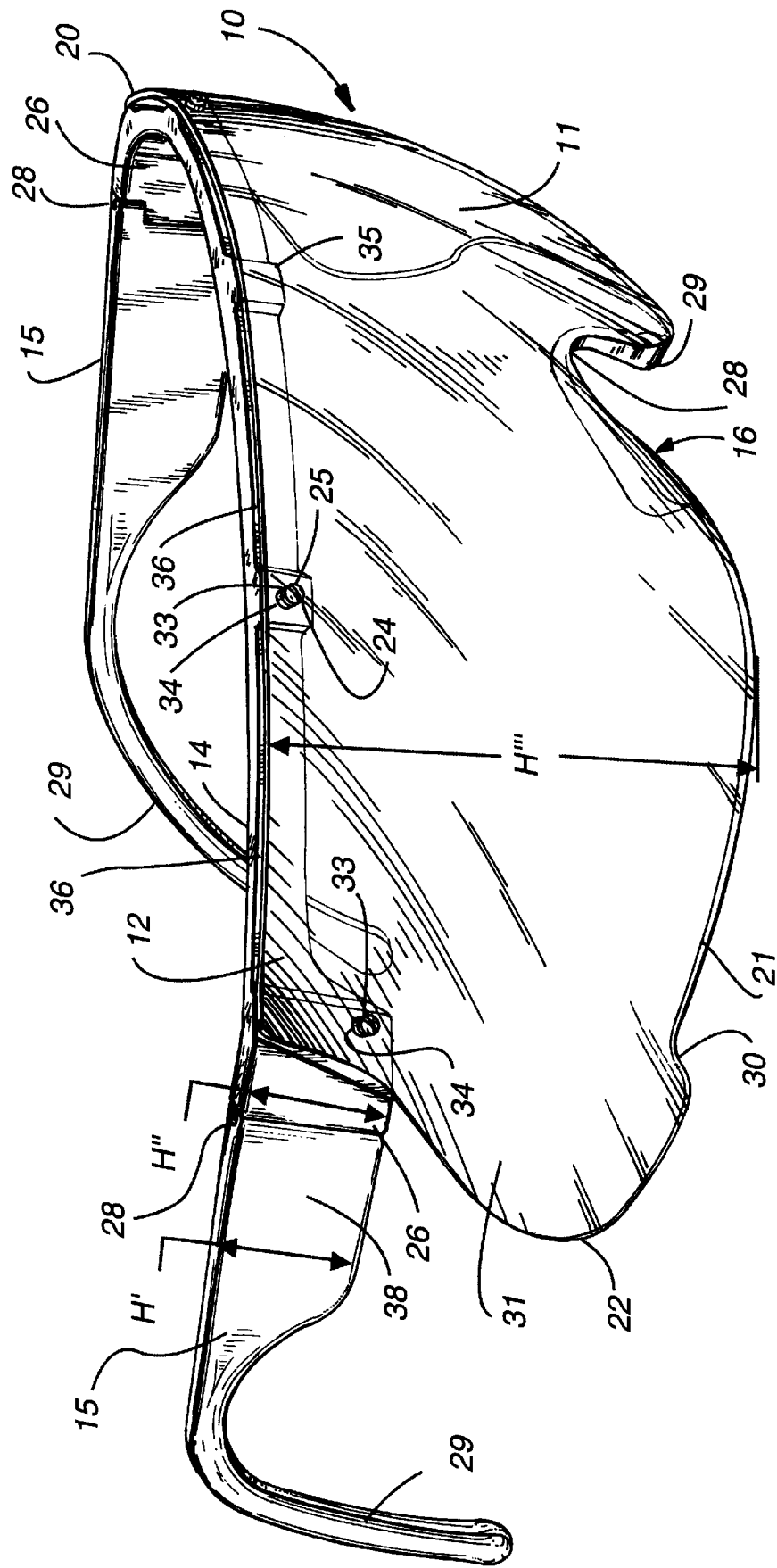
FIG. 1 is a front perspective view of sunglasses embodying the present invention.

The present invention is embodied in sunglasses 10 formed by a single piece, wraparound tinted lens 11 supported adjacent its upper edge portion 12 by a frame or bridge 14 hingedly secured at each end to temples or ear pieces 15. The lens includes an integral nosepiece 16 for supporting the eyeglasses on the bridge of a wearer's nose, and the temples or ear pieces include ear hooks 18 adapted to engage around the back of a wearer—s ears for holding the sunglasses on the wearer's face.

For providing a protective, nondistorting lens, the eyepiece or lens is integrally formed of a single piece of plastic or glass material, such as polycarbonate plastic, with a double curvature as shown in FIGS. 1, 7, 8 and 9. This double curvature further provides eye protection from sunlight leakage both at the top edge 20 and bottom edge 21 as well as peripherally at the side or end edges 22. The peripheral vision of a wearer is further protected by the provision of rounded side or end edges of the curved lens.

The lens is supported by the top frame 14 which is curved to conform to the curvature of the wearer's face and is provided intermediate its ends with mounting bosses or blocks 24 to which the integral lens 11 is secured by appropriate fasteners 25 such as screws which extend through apertures in the lens and engage the frame bosses. For preventing contact of the head 33 of each of the fasteners 25 with the surface of the lens 11, in the preferred embodiment, a plurality of cylindrical washers 34 are positioned adjacent the lens 11, each said washer 34 circumscribing one of the fasteners 25. An outwardly extending center block 35 is formed in the frame 14 intermediate the two innermost mounting blocks 24. The center block 35 and the two innermost mounting blocks 24 define therebetween a pair of notches 36 of the frame 14. Other notches 36 are defined in the frame 14 by adjacent mounting blocks 24. The center block 35 is similar in shape to the mounting blocks 24, except that in the preferred embodiment, the center block 35 does not include means for fastening the lens 11 centrally to the frame 14. Thus, the lens 11 is not fixedly attached to the center of the frame 14 at the center block 35, but rather rests against the center block 35. For fastening the frame 14 to the temples 15, a frame hinge support 26 depends from each end of the frame 14 and at its free edge is provided with a hinge 28 which is secured to both the frame hinge support 26 and the end of the temple 15 opposite an ear engaging hook 29. The temple 15 has a widened portion 38 which has a height H' substantially equal to a height H" of the hinge support 26, both of which are approximately ⅓ the height H''' of the lens 11. The temple 15 is preferably made of an opaque material. The size of the glasses can be adjusted by bending the frame ends and hinge supports independently of the lens to fit a user's head.

Figure 6:
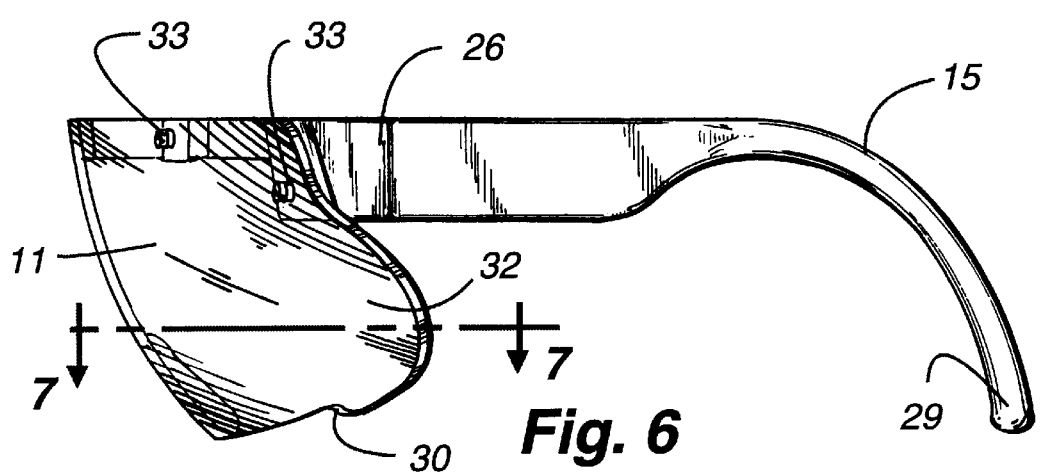
FIG. 6 is a side elevation view of the sunglasses shown in FIG. 1.
Figure 8:
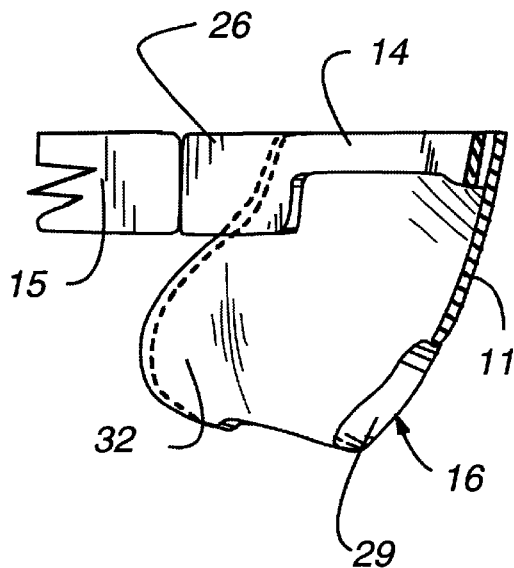
FIG. 8 is a section view taken substantially in the plane of line 8—8 on FIG. 3.
Figure 7:
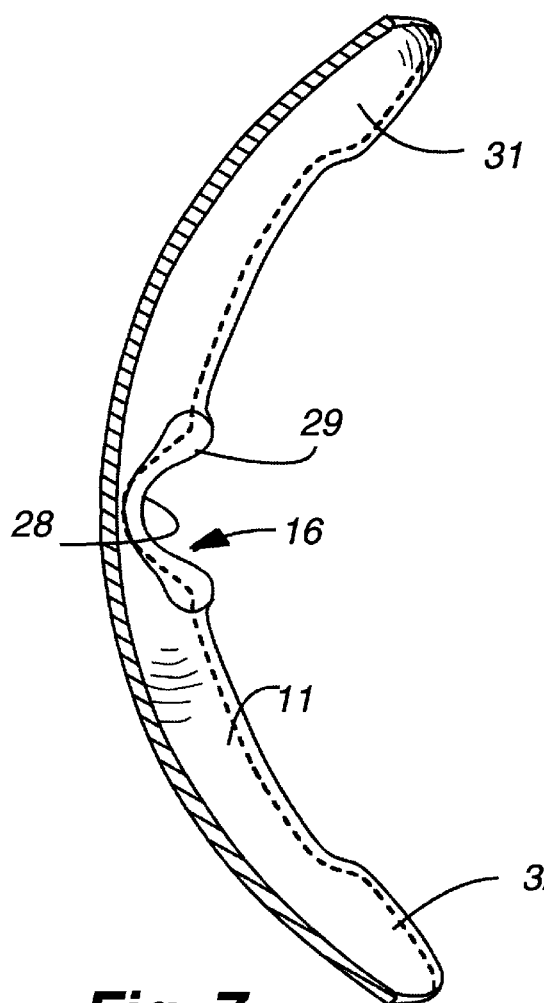
FIG. 7 is a section view taken substantially in the plane of line 7—7 on FIG. 6.
Figure 9:
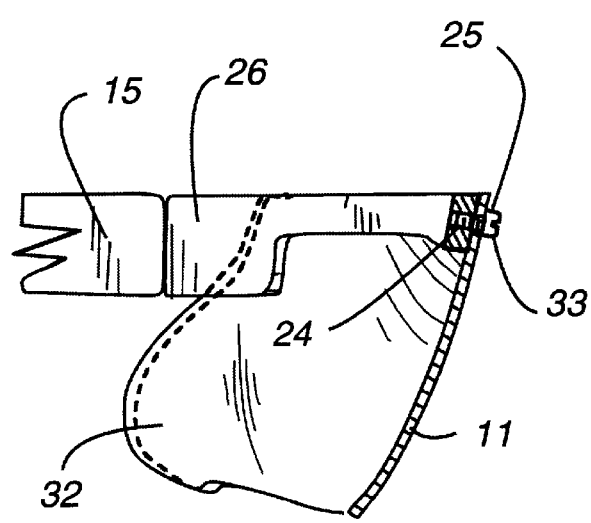
FIG. 9 is a section view taken substantially in the plane of line 9—9 on FIG. 3.

For protecting the wearer's eyes, the lower edge of the unitary lens is desirably positioned below and inwardly of the mounting frame as shown in FIG. 6. At its central lower portion, the lens 11 includes a rounded notch 28 forming an integral nosepiece 16 with an integral nosepiece pad 29 for resting on the wearer's nose. The bottom edge 21 of the lens is curved to conform generally to a wearer's cheek and a cheek recess 30 is provided between the bottom lens edge and each curved side edge 22 of the lens.

The peripheral vision areas of the eye are protected by projecting side shields 31, 32 which are integral with the lens and extend rearwardly therefrom below the frame hinge support 26, hinge 28 and temple 15. The curved side shields wrap around the side of the wearer's head to protect the peripheral portions of the user's eye.

Figure 2:
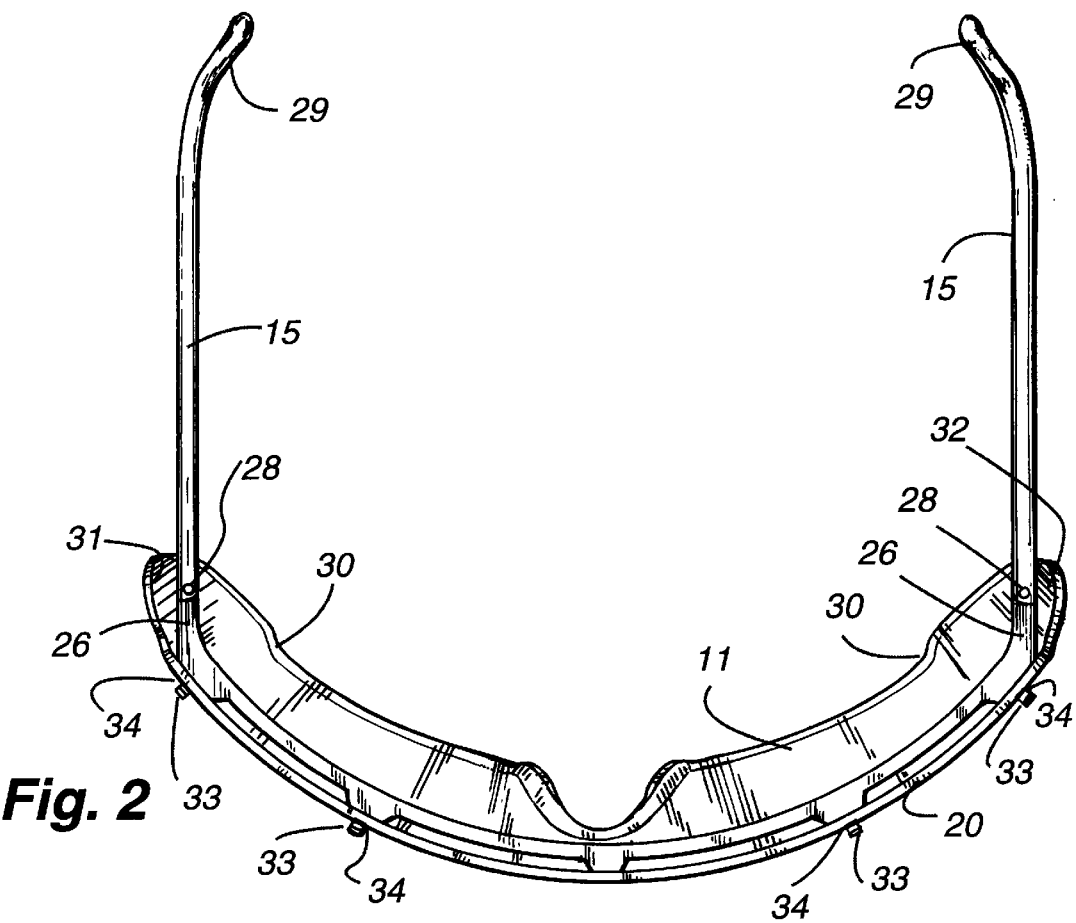
FIG. 2 is a top plan view of the sunglasses shown in FIG. 1.
Figure 3:
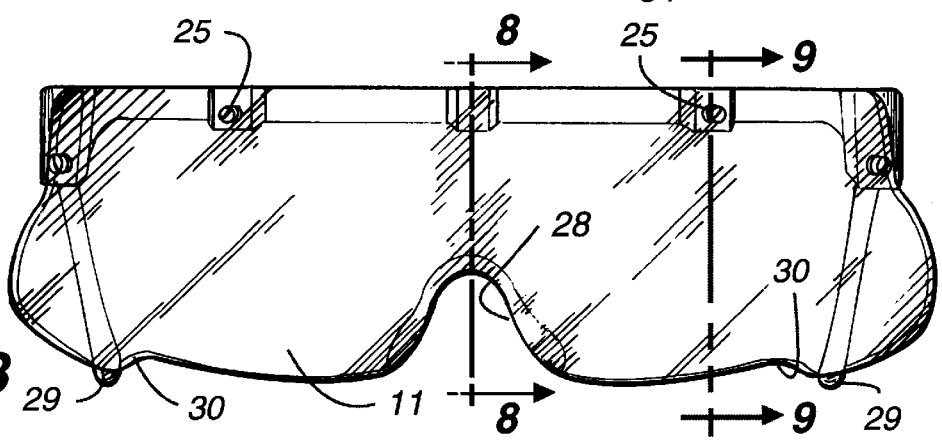
FIG. 3 is a front elevation view of the sunglasses shown in FIG. 1.
Figure 4:
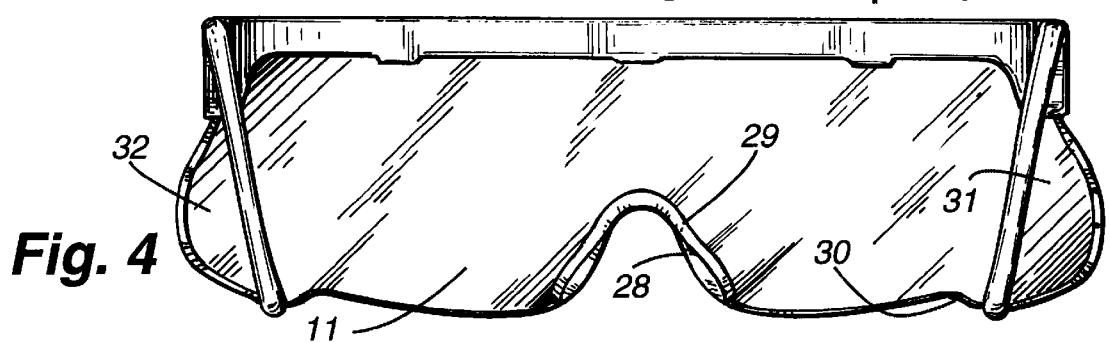
FIG. 4 is a rear elevation view of the sunglasses shown in FIG. 1.
Figure 5:
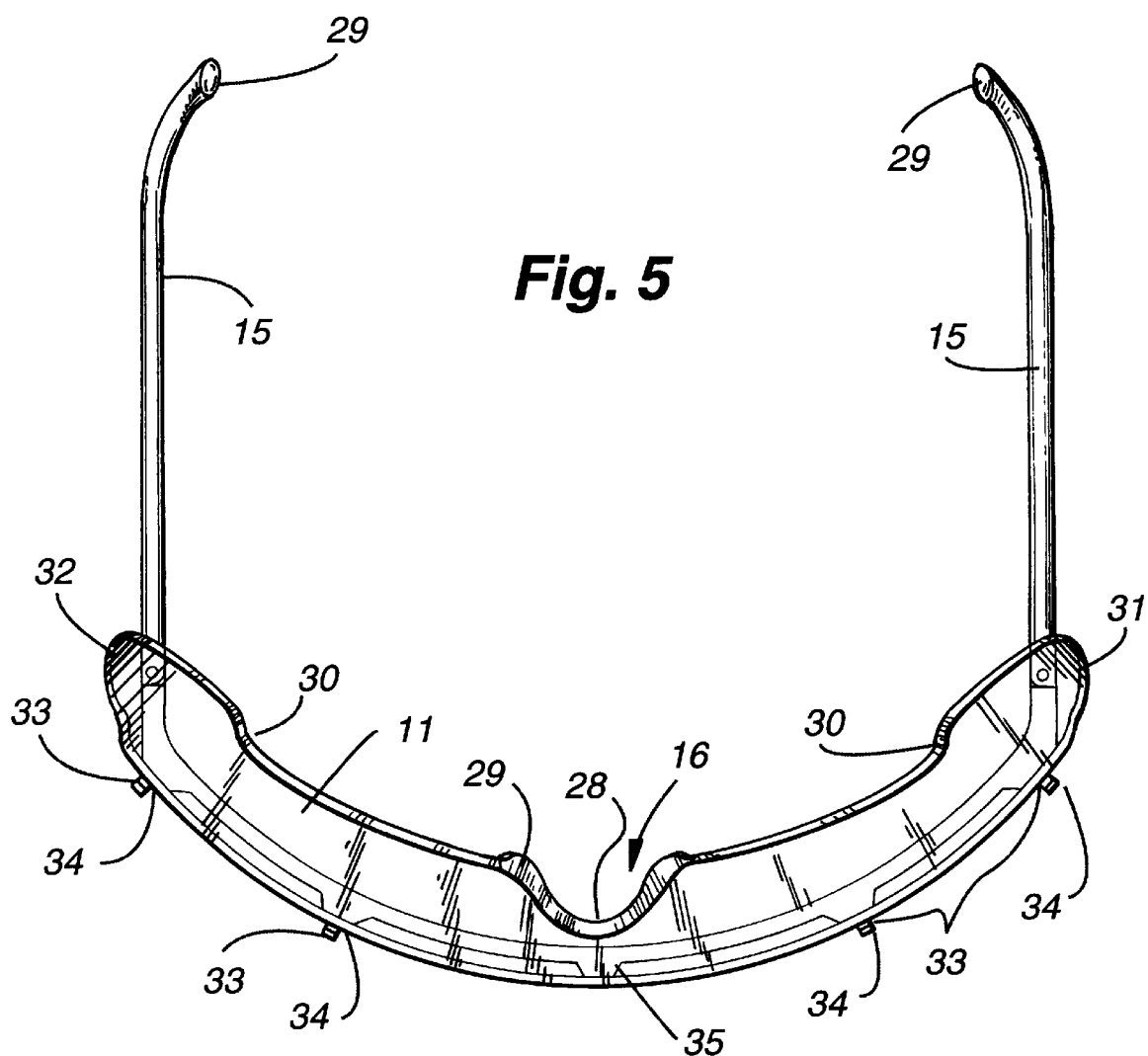
FIG. 5 is a bottom plan view of the sunglasses shown in FIG. 1.

When the sunglasses are fitted on a user's face in front of the eyes, the curved, unitary lens covers the portion of the wearer's face from the eyebrows to the cheekbones and wraps around the front and sides of the wearer's face to provide front, top, bottom and peripheral protection without interfering with the temples 15 or hinges 28 (FIG. 2) or the adjustment thereof.

The side shields are smoothly rounded thereby eliminating sharp edges or corners and increasing the comfort to the user wearing the sunglasses embodying the present invention as well as enhancing the eye protection without increasing distortion of the side or peripheral view through the lens.

Figure 10:
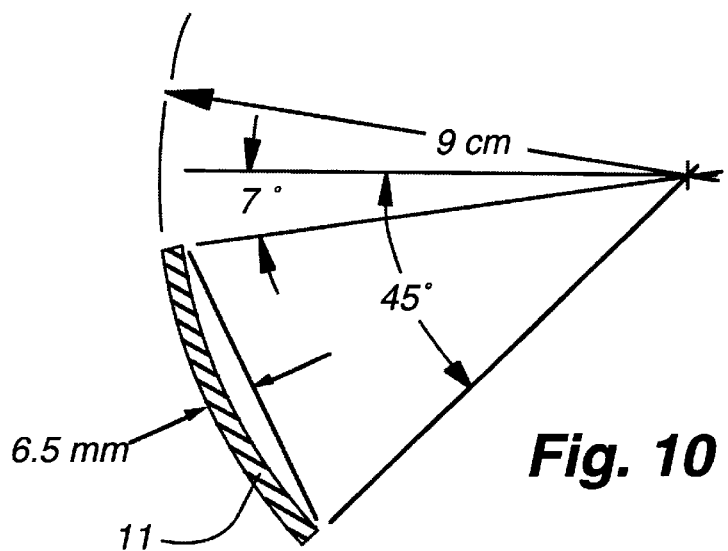
FIG. 10 is a diagram showing the spherical curvature of the lens in a vertical diametrical plane.
Figure 11:
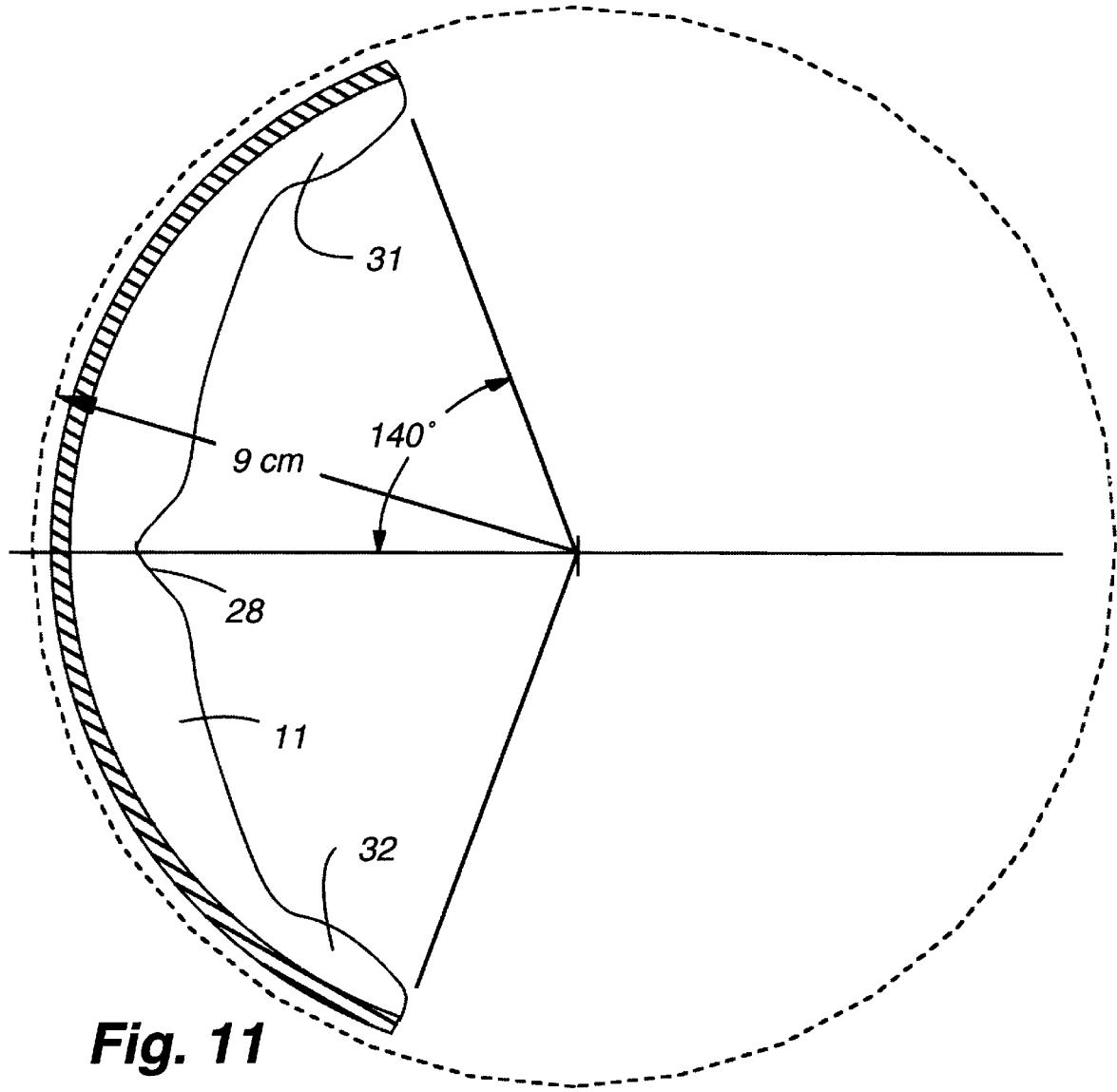
FIG. 11 is a diagram showing the spherical curvature of the lens in a horizontal diametrical plane.

To reduce distortion of the view through the lens while providing for clear, glare-free, unobstructed vision at all angles with complete protection from ultraviolet radiation, the single or unitary lens embodying the present invention is shaped with a spherical surface based on a sphere having a radius of about 9 cm. As shown in FIGS. 10 and 11, the lens in vertical cross section defines an arc of about 38° beginning at a top edge about 7° below the horizontal diametrical plane of the sphere, and ending at a bottom edge at an angle of about 45° below the diametrical plane. The lens in a diametrical plane cross section subtends an arc of about 140°. With the spherical configuration, refraction and distortion is maintained at a minimum. The preferred material for the lens is 1.6 mm. polycarbonate tinted at a neutral color to enable golf users, for example, to study and read greens or other colors depending upon the intended use.

Provision can be made in the sunglass's structure described herein for the insertion of an inner frame containing prescription lenses. The prescription lens frame (not shown) can be readily inserted between the unitary lens 11 and the frame cross bar 14 between the mounting bosses 24. Curvature of the unitary lens from the exterior surface to a chord is 6.5 mm. as shown in FIG. 10.

While a certain illustrative embodiment of the present invention has been shown in the drawings and described above in detail, it should be understood that there is no intention to limit the invention to the specific form disclosed. On the contrary, the intention is to cover all modifications, equivalents and uses falling within the spirit and scope of the invention as expressed in the appended claims.

I claim:
1. Sunglasses, comprising:
   an elongated curved frame having a plurality of forwardly projecting blocks extending therefrom defining a plurality of notches of the frame therebetween;
   a pair of opposing hinge supports, one each mounted to an end of the curved frame;
   a pair of opposing elongated temples, each having a depending ear piece at a first end thereof and an opposed widened portion hingedly mounted to one of said hinge supports at a second end thereof;
   a unitary, double-curved nondistorting wraparound lens having an upper curved edge corresponding in curvature to said frame, integral side peripheral vision panels extending therefrom below said hinge supports generally parallel to said temples, and a lower edge having a recess defined in a central portion of said lens and defining an integral nosepiece on said lens; and
   a plurality of fasteners securing said lens to forward surfaces of a plurality of said blocks spacing said lens from said frame at said notches between said blocks and leaving one of said blocks adjacent said central portion of said lens unsecured to said lens.

2. The sunglasses according to claim 1, wherein said hinge supports each have a height approximate one third a height of said lens.

3. The sunglasses according to claim 2 wherein said hinge supports are opaque.

4. The sunglasses according to claim 1 wherein said hinge supports are opaque.

5. The sunglasses according to claim 1 wherein said lens has a plurality of holes formed therein, and wherein said sunglasses further include a plurality of cylindrical mounting heads for receiving said fasteners, each mounting head extending forwardly from a mounting block through a corresponding lens hole.

6. Sunglasses, comprising:
   an elongated curved frame having a plurality of outwardly projecting mounting blocks extending therefrom defining a plurality of notches of the frame therebetween;
   a pair of opposing hinge supports, one each mounted to an end of the curved frame;
   a pair of opposing elongated temples, each having a depending ear piece at a first end thereof and an opposed, opaque widened portion hingedly mounted to one of said hinge supports at a second end thereof;
   a unitary, double-curved nondistorting wraparound lens having an upper curved edge corresponding in curvature to said frame, integral side peripheral vision panels extending therefrom below said hinge supports generally parallel to said temples, and a lower edge having a recess defined in the central portion thereof defining an integral nosepiece on said lens; and
   a plurality of fasteners securing said lens to a plurality of said mounting blocks leaving space between said frame and said lens at said notches.

7. The sunglasses according to claim 6, wherein said hinge supports each have a height approximate one third a height of said lens.

8. The sunglasses according to claim 6 wherein said lens has a plurality of holes formed therein, each said fastener includes a head an exposed end thereof, and wherein said sunglasses further include a plurality of washers positioned adjacent said lens for receiving said fasteners and preventing said fastener heads from contacting said lens.

9. Sunglasses, comprising:

an elongated curved frame having a center block forwardly projecting from a center of said elongated frame, a pair of intermediate mounting blocks extending outwardly from said frame spaced from said center block, a pair of outermost mounting blocks extending outwardly from said frame, each said outermost mounting block adjacent and spaced from one of said intermediate mounting blocks, said mounting blocks defining a plurality of notches of said frame therebetween;

a pair of opposing hinge supports, one each mounted to an end of the curved frame adjacent one of said outermost mounting blocks;

a pair of opposing elongated temples, each having a depending ear piece at a first end thereof and an opposed, opaque widened portion hingedly mounted to one of said hinge supports at a second end thereof;

a unitary, double-curved nondistorting wraparound lens having an upper curved edge corresponding in curvature to said frame, integral side peripheral vision panels extending therefrom below said hinge supports generally parallel to said temples, and a lower edge having a recess defined in the central portion thereof and defining an integral nosepiece on said lens; and a plurality of fasteners securing said lens to at least two intermediate mounting blocks and at least two outermost mounting blocks.

10. The sunglasses according to claim 9, wherein said hinge supports each have a height which is approximately one third a height of said lens.

11. The sunglasses according to claim 9 wherein said lens has a plurality of holes formed therein and said sunglasses further include a plurality of washers, one each of which is positioned adjacent said innermost and outermost mounting blocks for preventing said fastener from contacting an outwardly facing surface of said lens.

12. The sunglasses according to claim 9 wherein said lens has a spherical radius of approximately 9 cm. and defines an arc in vertical cross section of approximately 38° beginning approximately 7° below a horizontal diametrical plan and subtends an angle of about 140° in a diametrical plane.

13. The sunglasses according to claim 12, wherein said hinge supports each have a height approximate one third a height of said lens.

* * * * *